Oct. 11, 1938.  H. MÜLLER ET AL  2,133,038
BLOW SWITCH OPERATED TOY
Filed March 13, 1937  6 Sheets-Sheet 1

INVENTORS
Heinrich Müller,
Karl Vogt and
Alfred Mich.
By Arthur M Hahn
ATTY.

Oct. 11, 1938.   H. MÜLLER ET AL   2,133,038
BLOW SWITCH OPERATED TOY
Filed March 13, 1937   6 Sheets-Sheet 2
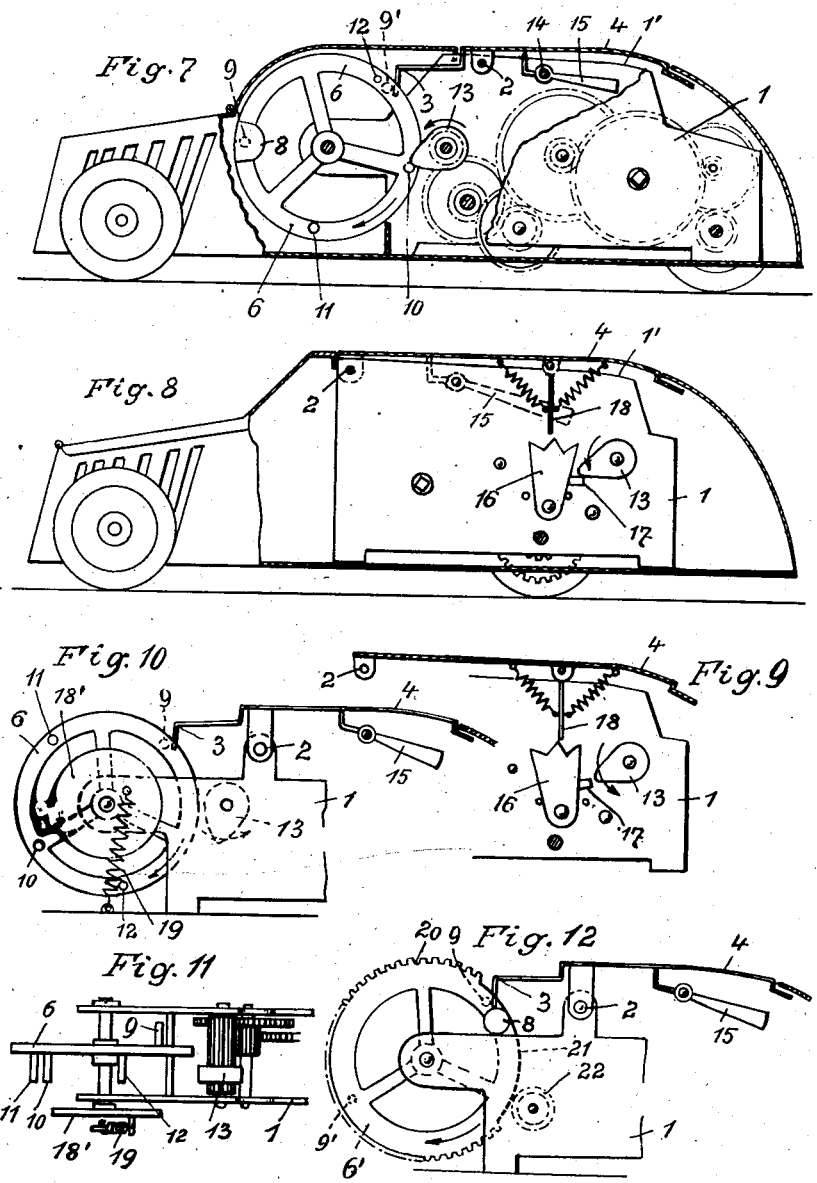

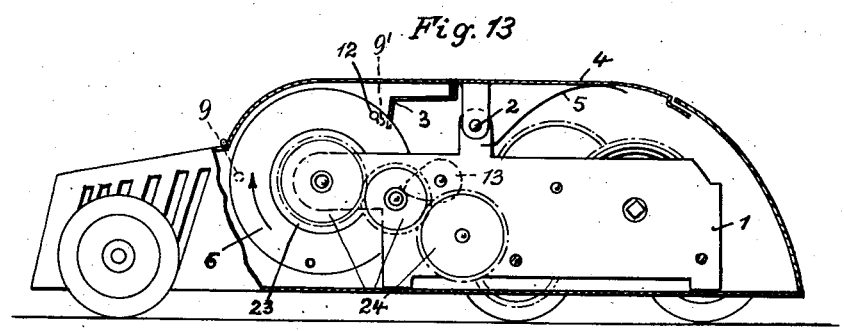
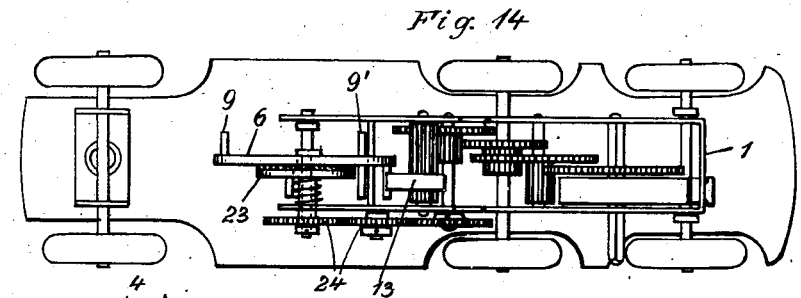
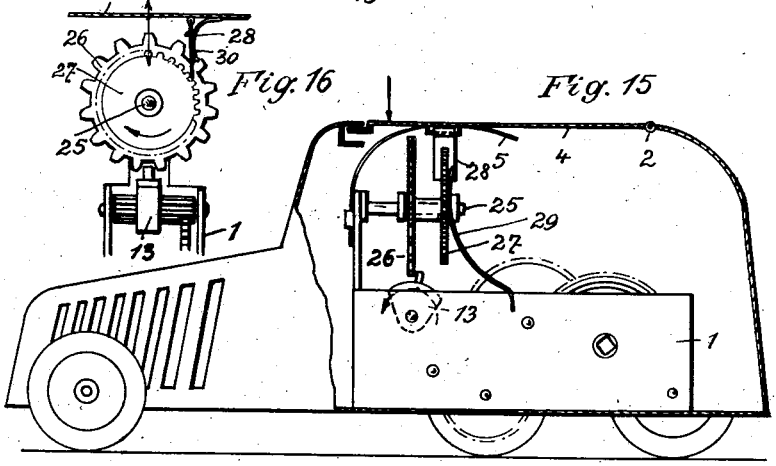

Oct. 11, 1938.   H. MÜLLER ET AL   2,133,038
BLOW SWITCH OPERATED TOY
Filed March 13, 1937   6 Sheets-Sheet 4

INVENTORS
Heinrich Müller
Karl Vogl, and
Alfred Fich.
BY
ATTY.

Oct. 11, 1938.  H. MÜLLER ET AL  2,133,038
BLOW SWITCH OPERATED TOY
Filed March 13, 1937  6 Sheets-Sheet 5

INVENTORS
Heinrich Müller
Karl Vogl, and
Alfred Mich
By Arthur M Hahn
ATTY.

Oct. 11, 1938.   H. MÜLLER ET AL   2,133,038
BLOW SWITCH OPERATED TOY
Filed March 13, 1937   6 Sheets-Sheet 6

Patented Oct. 11, 1938

2,133,038

UNITED STATES PATENT OFFICE 2,133,038

BLOW SWITCH OPERATED TOY

Heinrich Müller, Nuremberg, Karl Vogl, Muhlhof-on-the-Schanz, and Alfred Wich, Furth, Germany; said Vogl and said Wich assignors to said Müller Application March 13, 1937, Serial No. 130,778
In Germany January 25, 1937

22 Claims. (Cl. 46—210)

Figure 24:
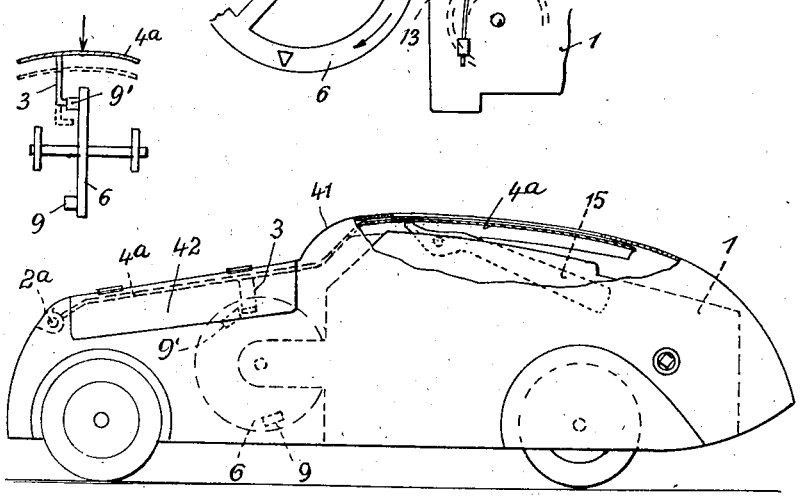
Figure 25:
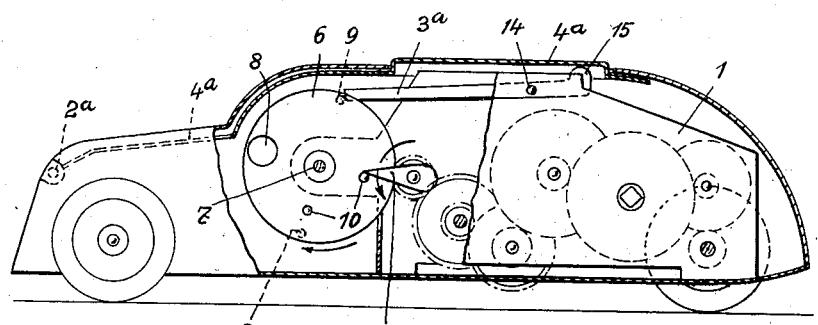
Figure 26:
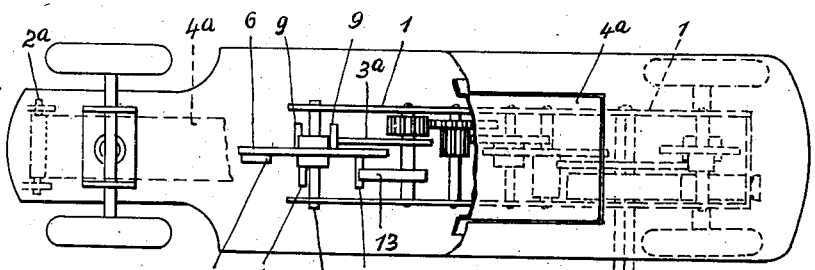

This invention relates to blow-switch operated toys and more particularly to toys of this kind having the form of a toy-vehicle provided with a spring-driven clockwork and essentially consists in the provision of a transmission gearing interposed between the blow-switch and said clockwork for releasing and locking the same for initiating and stopping motion of the toy upon actuation of said blow-switch.
More particularly, our invention consists, besides in the construction of toys of the aforementioned kind, for instance in the form of a toy-automobile which may be started and stopped upon actuation of said blow-switch also in the construction of stationary clock-work driven toys, the specific operating motion thereof being likewise controlled upon actuation of said blow-switch by means of an intermediary transmission gearing for starting and stopping the toy or otherwise controlling its operating motions.
In this manner, according to our invention, locking and releasing of the clockwork of the toy may be effected and controlled as frequently as desired and in continuous succession upon repeated actuation of said blow-switch to start and stop or otherwise control the motion of the toy within the limits of the power of the spring driving the clockwork.
The transmission gearing provided according to our invention intermediate said blow-switch and said clockwork, in a more specific sense, serves for the alternate control of a stationary or travelling toy upon actuation of one and the same blow-surface of said blow-switch which may consist of a member of the body of the toy and, therefore, will in no way form a conspicuous additional device. By so controlling the toy the travelling or other motion thereof may be controlled in a novel and surprising way which is due to the fact that the blow-switch and the transmission gearing interposed between the latter and the clockwork as a whole constitute a very sensitive control mechanism permitting actuation of the blow-switch by merely blowing or speaking against the toy, whereby in either case an air-current will be produced sufficient to actuate the blow-switch and the control mechanism connected thereto.
Moreover, according to our invention, said transmission gearing may also be used in a simple and convenient manner for the control of still further operating motions of the toy which motions may likewise be stopped or initiated by said blow-switch. These additional operating motions of the toy may of course also be effected or controlled by means of a special blow-switch or switches provided in addition to that serving for the control of the main operating motion of the toy.
In the accompanying drawings we have represented a number of constructions of our present toy, the toy being shown throughout the drawings as consisting of a toy-automobile which may be controlled to be stopped or started by a blow-switch in accordance with our invention.
In the drawings Fig. 1 is a side-view, with broken away casing, of a toy-automobile including a blow-switch, an intermediary transmission gearing as well as the spring-driven clockwork of the toy-automobile, Fig. 2 a top-view on Fig. 1 with the casing entirely removed, Fig. 3 a further top-view on Fig. 1 showing particularly the blow-switch which serves to control the travelling motion of the toy, Figs. 4 and 5 are detail views showing said transmission gearing in intermediate position of control and in the form of a steering wheel, Fig. 6 a further detail view of a steering wheel of construction somewhat different from that shown in Figs. 4 and 5, Fig. 7 a side-view of a toy-automobile of a construction different from that of Fig. 1, including a clockwork that extends with its lateral plates upward as far as underneath the blow-surface or membrane of the blow-switch, so that said plates will form a support for said blow-switch as well as stops for limiting swinging motion of the latter, Fig. 8 a similar side-view of another construction of our new toy-automobile having a transmission gearing in the form of a swingable toothed segment, Fig. 9 a detail view of said toothed segment of Fig. 8 in an operating condition different from that shown in Fig. 8, Fig. 10 a partial detail view showing the clockwork of the toy and a steering wheel forming part of said transmission gearing, said steering wheel being under the action of a spring, Fig. 11 a plan-view on Fig. 10, Fig. 12 a partial side-view of the clockwork with a transmission gearing in the form of a steering wheel constructed as a mutilated gear-wheel, Fig. 13 a side-view of a toy-automobile comprising a transmission gearing in the form of a disk rotated by means of a friction-clutch in inoperative condition of the blow-switch, Fig. 14 a top-view on Fig. 13, with the casing removed, showing the clockwork mounted on the base-plate of the toy, Fig. 15 a further side-view of a toy-automobile having a transmission gearing of the form of a locking gear-wheel, Fig. 16 a detail side-view of said locking gear-wheel of Fig. 15, Fig. 17 a side-view, with broken away casing, of a toy-automobile in which the steering wheel forming the transmission gearing is again constructed as a mutilated gear-wheel associated with a cam serving to actuate an additional member which is being moved into the path of motion of said cam, whenever the blow-switch is actuated, Fig. 18 a top-view on Fig. 17, with the casing removed, showing particularly the clockwork, Figs. 19 and 20 are detail-views showing the transmission gearing in certain intermediary positions upon initiating the aforesaid additional motions of the toy, Figs. 20 to 23 enlarged detail-views of a steering wheel or transmission gearing in a preferred arrangement of the driving and locking members thereon, Fig. 24 is a side-view of a toy-automobile including a transmission gearing positioned within the motor hood, the latter also including supporting means for the blow-switch which in this case extends towards the front of the toy-automobile, said hood being further provided with a cover which may be opened to permit inspection of the interior of the toy and of the operating motions thereof as well as access to the mechanism of the toy, and Figs. 25 and 26 are a side-view and top-view, respectively, of a toy-automobile with partly broken away casing, said toy-automobile being equipped with a further improved extremely sensitive and finely adjustable blow-switch and control mechanism.

In all forms of construction of the toys shown in the drawings there is provided a transmission gearing intermediate the swingable blow-surface or membrane 4 of the blow-switch and the clockwork 1, as well as a locking-arm 3 provided on said blow-switch 4, said locking arm co-operating with said transmission gearing. In all forms of construction shown in the drawings, with exception of Figs. 8 and 9, the transmission gearing is shown in the form of a wheel or disk 6 or 6'. This wheel or disk is mounted freely rotatable on an axle 7 and provided on its one side near its periphery with stops or brake-pins 9, 9' rotating with said wheel or disk, the locking arm 3 of the blow-switch or membrane 4 being positioned within the path of rotation of said brake-pins.

Figure 1:
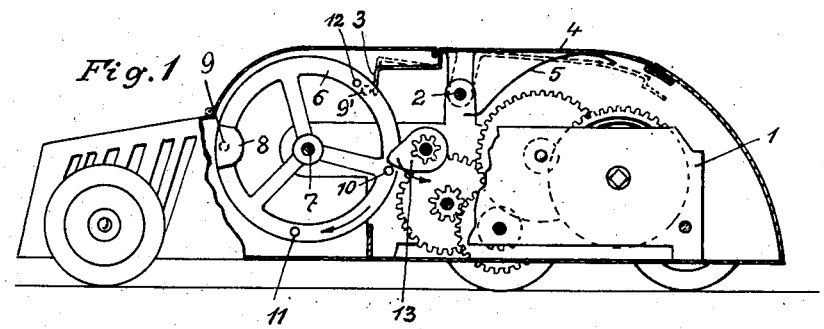
Figure 2:
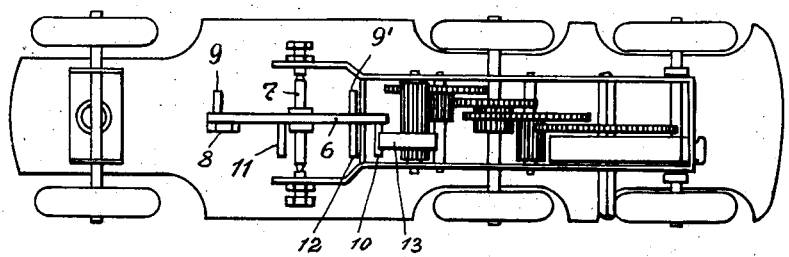
Figure 3:
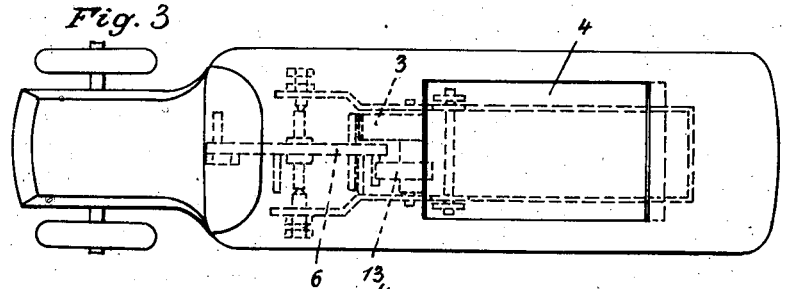
Figure 4:
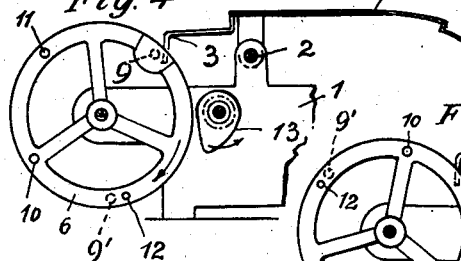
Figure 5:
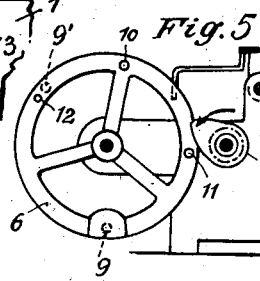
Figure 6:
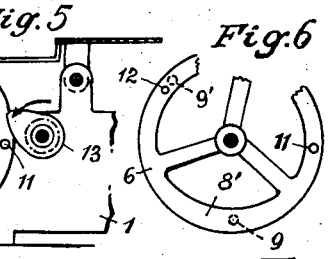

In the constructions of toys shown in Figs. 1 to 7, the wheel or disk forming part of the transmission gearing is equipped also at its other side and near its periphery with further pins 10, 11, 12 which upon rotation of said wheel or disk may be moved into the path of rotation of a cam 13 mounted eccentrically on an axle of the clockwork 1. The wheel 6 is further equipped, as shown in Fig. 1, with a weight 8 or, as shown in Fig. 6, with a thickened portion 8' both representing an excess of weight on one side of said wheel. The wheel 6, therefore, will have the tendency of being adjusted into a position having said excess of weight positioned underneath the axle 7.

In this position of the wheel 6, as shown in Figs. 5 and 6, the driving pin 11 is positioned in the path of rotation of said cam 13, so that the latter when abutting against said pin 11 will impart to said wheel 6 a swinging motion in clockwise sense, this swinging motion being maintained for such a length of time until pin 9' mounted on the other side of said wheel 6 abuts against the locking arm 3 of the blow-switch 4, as shown in Fig. 1.

In this position also the pin 10 on the other side of the wheel 6 is positioned in the path of rotation of the cam 13, rotation of the latter as well as rotation of the clockwork being thus stopped.

If now the blow-switch 4 is caused to swing downward by action of a current of air blown thereagainst, the locking arm 3 of said blow-switch 4 will move upward and release the brake-pin 9'. Cam 13 will now be released and again rotate by action of the clockwork and further cause rotation of said wheel by abutting against pin 10 until now it comes again in engagement with the second rear brake-pin and therewith with the locking arm 3 of the blow-switch 4 and kept fixed thereby. In this position, which is shown in Fig. 4, the excess weight 8 of the wheel body is positioned on the side of the locking arm and at this point will be received by the latter to be without effect.

In the path of rotation of the eccentrical cam 13 there is no further braking or actuating pin and the clockwork may thus run off to effect travel of the toy.

Upon further blowing against the membrane 4 the latter will move a short distance downward, the locking arm 3 thus releasing the brake-pin 9 on the wheel, so that the latter will be rotated by action of the gravity of weight 8 until the latter comes underneath the axle as shown in Fig. 5.

In this position now also the front pin 11 moves into the path of rotation of the cam 13 and the latter will move the wheel 6 into locked position shown in Fig. 1. In this position, as had been above explained, the clockwork will be locked, thus stopping the toy-automobile.

The construction shown in Fig. 7 comprises essentially the same arrangement of the transmission gearing, while the clockwork 1 is of a somewhat different construction. A particularity of this construction consists therein that the side-plates of the clockwork as shown at 1' are carried upward to such an extent that they will form stops as well as supports for the blow-switch or membrane 4 swingable about the point 2, so that said blow-switch or membrane may be of relatively thin construction and small weight. Instead of the side-plates of the clockwork, also some other member may be used to form a stop and support for said blow-switch or membrane 4.

The membrane 4 may be kept in its uppermost position by a spring 5, as indicated in the construction shown in Fig. 1, or instead of said spring 5 also a weighted lever 15 may be used to keep said membrane in this position, as shown in Fig. 10. According to Fig. 10 a double-armed lever 15 is used for this purpose, said lever being swingable about a pivot 14 fast on one of the plates 1' of the clockwork 1 and having one weighted arm, so that the other arm will abut under pressure against said membrane 4 to keep the latter in its uppermost or inoperative position.

This weighted lever 15 has the advantage that the sensitive membrane or blow-switch 4 is safely kept in its uppermost or inoperative position and protected against unintended actuation during travel of the toy on uneven ground or during other vibrations which may eventually be exerted on the toy.

According to Figs. 8 and 9 the transmission gearing interposed between the blow-switch 4 having its center of swing at the point 2 and the clockwork 1 consists of a swingable toothed member 16 which may be swung into the path of rotation of the cam 13 to engage the latter by means of a locking nose or detent 17 provided laterally on said member 16.

Swinging motion of said toothed member 16 is controlled as shown in Figs. 8 and 9 by means of a lever 18 which is pivotally mounted on the membrane 4 and kept under action of a spring at either side of said lever. Upon downward swinging of said membrane 4 said lever 18 will engage either with the left-hand or right-hand interstice between the teeth of member 16 to reverse the swinging motion of the latter, thereby to either lock or release the cam 13 and the clockwork 1, as shown in Figs. 8 and 9, respectively. In this construction also the aforementioned weighted lever 15 serves to move the membrane 4 back into its uppermost initial or inoperative position.

According to Figs. 10 and 11 the transmission gearing is of the form of a wheel 6 which instead of being provided with an excess of weight at one side thereof is adjusted by a spring 19 with the stop or pin 9 in its undermost position. From this position the wheel 6 may be rotated into locking position by action of the cam 13 as shown in Fig. 1. The spring 19 replacing the aforementioned weight on the wheel 6 engages with an outer disk 18' at a point near its center, said disk 18' being fixedly mounted on the axle of wheel 6.

In the construction shown in Fig. 12 the wheel forming the intermediary transmission gearing is constructed as a partial or mutilated gear-wheel 6' having teeth only at two opposite portions 20 of its circumference while the portions 21 are smooth. A weight 8 is likewise present on said wheel 6' in this case, said wheel being provided only at one side thereof with brakepins 9, 9' positioned to be within the path of motion of the locking arm 3 on the membrane 4. If the wheel 6', as shown in Fig. 12, is engaged by action of the brake-pin 9, the driving wheel 22 on the last axle of the clockwork 1 remains out of engagement and therefore the clockwork is released to run off. If now the blow-switch or membrane 4 is actuated to release pin 9, the weight 8 on the wheel 6' will move downward and cause rotation of the latter, the toothed portion of the periphery of said wheel now meshing with the pinion 22 which serves to operate the transmission gearing, that is the wheel 6', until the brake-pin 9' thereon abuts against the locking arm 3 connected to the blow-switch or membrane 4. In this case, however, there is still engagement between wheel 6' and pinion 22, so that the clockwork is locked and not released until the blow-switch 4 is again actuated.

Instead of a weight 8 or a spring 19 there may also be provided, as shown in Figs. 13 and 14, a friction-clutch 23 to start the transmission-gearing, said clutch being operated by a train of gear-wheels 24.

As long as the locking arm 3 forming part of the blow-switch 4 which is under action of a return spring 5 is out of engagement with the rotating cam 13, the friction-clutch 23 acts onto wheel 6 causing rotation of the latter, while said friction-clutch will be in sliding, that is in idle condition, if the transmission gearing is locked and the clockwork released to run off. In this construction also the transmission gearing in the form of said wheel 6 is provided at the rear thereof with brake-pins 9, 9' and at the front with driving pins; however, in this construction especially only one of said driving pins needs to be present in connection with the brake-pin 9' to lock the clockwork. Wheel 6, instead of being actuated by the friction-clutch 23, may also co-operate with a member imparting motion thereto as long as the clock-work is in released condition.

In the construction shown in Figs. 15 and 16 the transmission gearing is of the form of a locking gear-wheel 26 positioned transversely above a pin or finger provided on cam 13 which is rotated by the clockwork. Said gear-wheel 26 is provided with teeth all around its periphery, the pin or finger on said cam 13 being adapted to pass between the teeth of said wheel 26. If the wheel 26 is rotated through an angle to move one tooth thereof into the path of rotation of the pin or finger on said cam 13, the latter and therewith the clockwork will be locked.

Said locking gear-wheel 26 is further fixedly connected with a further gear-wheel 27 mounted on the axle 25. Control of said wheel 27 is effected by a movable pawl 28 fast on the membrane 4 and pressed by a spring 30 against the toothed periphery of wheel 27, as may be seen particularly from Fig. 16. If now the blow-switch or membrane 4 is actuated to swing downward about point 2 by action of a current of air blown or a word spoken thereagainst, the pawl 28 rotates the wheel 27 through a certain angle so that also wheel 26 will be rotated to an extent that in one case a tooth of this wheel will be in the path of rotation of the pin or finger on cam 13 and in some other case an interstice between the teeth will be positioned within this path of rotation.

Thus in the one case the clockwork is locked and therewith the travel of the toy stopped, while in the other case the clockwork is released to start the toy.

A spring 29 is slidingly engaging with the wheel 27 or some other locking means may be provided to secure proper rotation of the wheel 26 and locking or unlocking of the cam 13.

Figure 17:
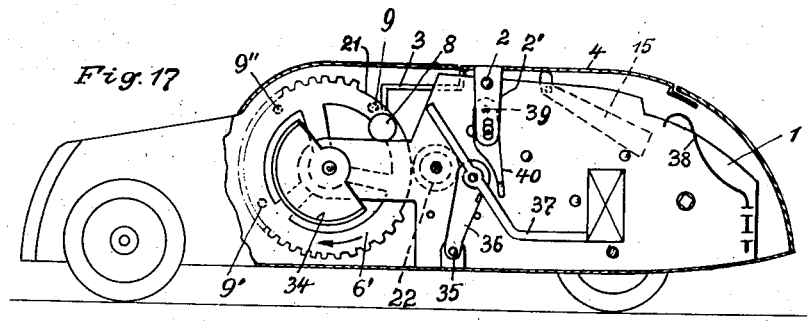
Figure 18:
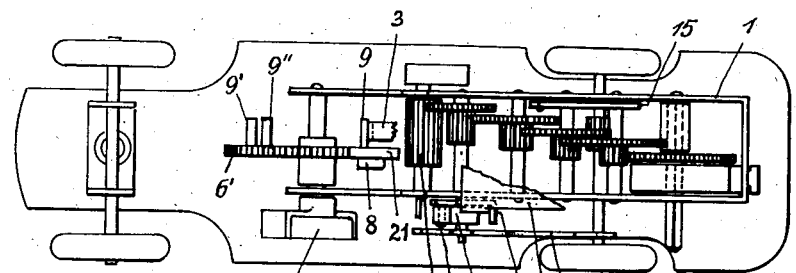
Figure 19:
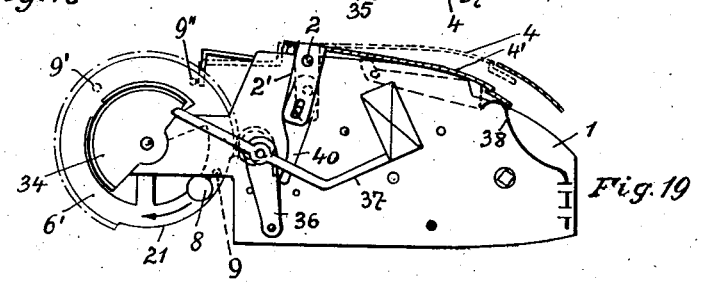
Figure 20:
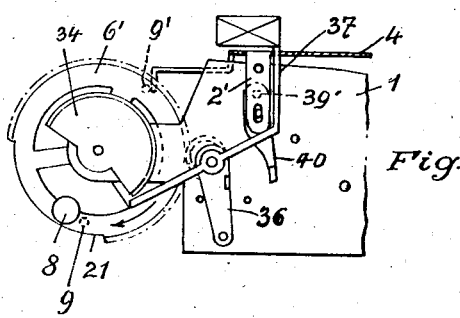

Figs. 17 to 20 show a form of construction of a toy-vehicle, in which the wheel forming part of the transmission gearing, the same as according to Fig. 12, is again constructed in the form of a mutilated gear-wheel 6' which is in operative connection with pinion 22 forming part of the clockwork 1. Wheel 6' is free of teeth along the portion 21 of its periphery and likewise provided with a weight 8 at one side thereof as well as with the brake-pins 9, 9'. However, intermediate the brake-pins 9, 9' there is provided in the present case a third brake-pin 9''. The locking lever 3 connected to the membrane 4 swinging about point 2 projects into the path of rotation of the aforesaid pins 9, 9', 9'', said membrane 4 being kept in its inoperative uppermost position by action of the weighted lever 15. Laterally of said mutilated gear-wheel 6' there is mounted a cam 34 on the axle of the former, said cam having the form of an open ring. A reversing weight 36 likewise in the form of a weighted lever is mounted at one side of the clockwork to rock between a pair of stops as shown in Figs. 17, 19 and 20. In either end-position of said lever 36, that is when being locked by said one or other stop, said lever will be positioned obliquely with respect to the perpendicular direction, thus being kept in this position by its own weight.

The free end of the weighted lever 36 is pivoted to a rod 37, said rod forming a double-armed lever, the rear arm thereof carrying a signal, flag or some other sign which during some later course of motion or during stopping of the toy may be swung outward to indicate the respective condition of the toy.

Outward swinging of said rod 37 is likewise controlled by said membrane 4, this latter control being effected by some stronger current of air blown against said membrane 4 or by exerting thereunto an actual bodily pressure considerably in excess of the pressure exerted by mere blowing. For this purpose, the membrane 4 is further provided with a lever 2' extending laterally out of the former and being provided with a pressure-finger 40 swingable about a fixed point 39 of said lever 2' and co-operative with the latter.

Motion of the membrane 4 controlling said mutilated gear-wheel 6' by mere blowing against said membrane is limited by a spring 38, said spring permitting upon further actuation of said membrane by some stronger current of air or by some bodily pressure exerted thereunto a further downward motion of said membrane. Upon such further downward motion said lever 2' moves forward into oblique position thus rocking the pressure finger 40 in forward direction, the latter now also rocking the lever 36 likewise in forward direction round its pivot point 35 as shown in Fig. 19.

The front end of the rod 37 now moves into the opening of said ring 34 and upon further actuation of the membrane 4 the mutilated gear-wheel 6' is rotated, said ring 34 being carried with the latter and imparting upward swinging motion to the rod 37 so that the end thereof which carries the signal, flag or the like moves towards the outside of the toy-vehicle for indicating purposes as shown in Fig. 20. Said signal, flag or the like at the end of rod 37 may now again be retracted into the body of the toy-vehicle by action of the shock produced during starting the toy from condition of rest, this starting being due to a further actuation of the membrane or blow-switch 4.

The undermost position assumed by the membrane 4 upon exerting a bodily pressure or some stronger blowing action thereon is shown in Fig. 19, this position being indicated by the reference numeral 4'.

Figure 21:
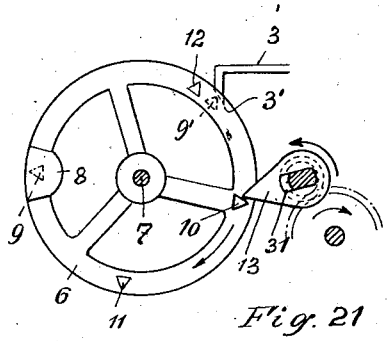
Figure 22:
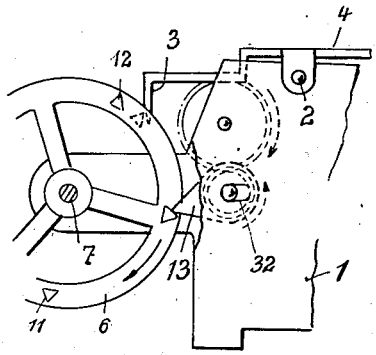
Figure 23:
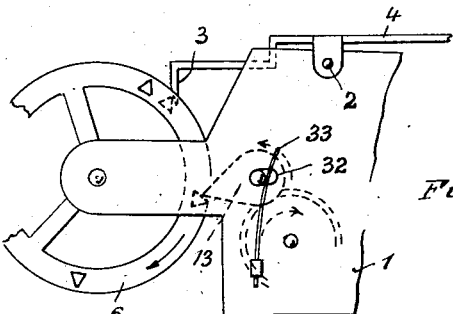

The brake-pins 9, 9' as well as the pins 10, 11, 12 on the wheel 6 which forms the transmission gearing are preferably of angular cross-section presenting edges as may be seen from Figs. 21, 22 and 23. The cam 13 as well as the end of the locking lever 3 connected to the membrane 4 are preferably of oblique or pointed conformation, because this will contribute to attain a sensitive control of the stopping and releasing motions, at the same time avoiding any jamming between the respective operating members of the control mechanism.

In order to safely prevent such jamming, the cam 13 may also be mounted to yield in direction towards the rear of its rotary motion. For this purpose said cam 13 may be provided with a slot 31 permitting said cam to move radially inward with respect to the axle on which it is mounted, as shown in Fig. 21. As an alternative to this, also the entire driving axle carrying said cam 13 may be mounted within a bearing-slot 32 provided in the casing of the clockwork 1 and may for instance be kept in operative position by a wheel as indicated in Fig. 22 or by action of a spring 33 as indicated in Fig. 23.

The wheel 6 or 6' forming the transmission gearing may be mounted in any desired position on the casing of the toy; preferably, said wheel is mounted within the motor-hood of the casing 41 of the toy-vehicle, as diagrammatically indicated in Fig. 24. The motor-hood is provided for this purpose with a cover 42 foldably mounted on the former, opening of said cover permitting inspection of the interior of the toy and especially of the control and operating members for the wheel 6 or 6', as well as access to said operating members for purposes of repairing or for removing troubles which may eventually arise.

As shown in Fig. 24, the blow-switch or membrane 4a is provided at the interior side of the casing of the toy and the pivot-point 2a of said membrane is placed further towards the front, that is on the motor-hood of the toy-vehicle. The membrane 4a is exposed to the action of blowing or the like through an aperture in the upper part of the casing 41, the walls of the latter forming so-to-say a margin for said membrane serving to concentrate the current of air blown thereagainst and preventing lateral dislocation thereof.

The membrane 4a with its pivot point 2a at the front of the motor-hood may also be of foraminous construction in order not to obstruct inspection of and access to the operating members of the toy upon opening the cover 42.

Without departing from the principles forming part of our present invention and from the constructions described hereinabove and shown in the drawings, it will be necessary, especially in case of small toys that are naturally equipped with a relatively small blow-switch or membrane, to have the cam 13, as well as the members 22, 6, 6' and 3 co-operate with each other at a very small contact-pressure with the result that control of the toy will be possible by only a small pressure exerted by merely blowing against the blow-switch.

This small contact-pressure may practically be attained in case of small toys by mounting the cam 13 or the pinion 22 on the last axle of the clockwork, so that the members 13 or 22 will rotate at high speed.

In addition to the control of the travelling motion of the toy, further motions or operations of the toy may likewise be controlled by providing further blow-switches or membranes. Such further operations may, for instance, consist in firing a shot, in case of toys of the form of a tank, or in outward or inward swinging of a signalling device or the like.

The wheel 6' instead of being provided with a toothed periphery as shown in Figs. 12 and 17, may likewise be rotated by action of a friction, in which case the pinion 22 may be replaced by a friction roller driving said wheel 6'. Said wheel 6 or 6', furthermore, may also be constructed in the form of a spider, a segmental disk or the like.

The brake-pins 9, 9', 9'' as well as the pins 10, 11, 12 are preferably provided laterally of the wheel 6 or 6' but may also be positioned at any desired other place of the toy.

When using the terms "blow-switch", "blow-surface", "membrane" or the like we desire of being understood that these terms comprise any surface which is adapted to be actuated by means of a current of air blown thereagainst, irrespective of the fact whether this current of air is produced by actual blowing or by speaking. For instance, said blow-switch may be actuated by speaking thereagainst such words as "off", or "stop" or the like to effect control of the respective operating motions of the toy.

An especially fine adjustment and great sensitiveness of the blow-switch and the control effected thereby may be attained by the construction of blow-switch shown in Figs. 25 and 26. In this form of blow-switch the pins 10 are mounted on the wheel 6 at some smaller distance from the center than the brake-pins 9, this difference of the distances resulting in most favorable conditions as regards co-operating control-members.

In this construction, moreover, the locking arm 3a is of the form of a double-armed lever rocking about the point 14, said lever being provided at one arm thereof with a weight, which weight, however, may also be replaced by a spring. In the construction shown the front end of said lever which co-operates with the brake-pins 9 on the wheel 6 will overbalance the other arm of said lever, so that the rear end 15 will act as support and re-adjusting member for the membrane 4a subsequent to actuation thereof. Said membrane will thus automatically swing back into its uppermost or inoperative position, so that no further re-adjusting device will be necessary for said membrane. The cam 13 rotating with the clockwork and co-operating with the impact pin 10 of the wheel 6 is provided with an excess of weight opposite to its impact pin, said excess of weight thus effecting a balance compensating for the one-sided action of masses of said cam, thus contributing to the regular and smooth operation of the clockwork. In consequence of this, the actuation of the blow-switch as well as proper control of the operating motions of the toy as well as its re-adjustment into inoperative position by said lever 15 will be attained with certainty. In addition to this, the blow-switch will readily respond even to a very weak current of air blown thereagainst.

On account of the highly sensitive adjustment of the blow-switch the clockwork and therewith the operating motions of the toy may also be effectively controlled by a very weak current of air blown against the former, which current of air may be produced by speaking a certain word, such as "off", "stop" or the like against the blow-switch.

This improved highly sensitive adjustment of the blow-switch is not confined in its application to a travelling toy but may likewise be used in connection with any stationary toy driven by a clockwork in order to control the latter, and the operating motions of the toy.

We claim:

1. A toy comprising a clockwork, a transmission mechanism for alternately locking and releasing said clockwork, and a blow-switch for controlling the action of said transmission mechanism, said blow-switch being fulcrumed at a point causing it to be sensitive to a small force, whereby the successive applications of a small force to said blow-switch will alternately cause the locking and releasing of said clockwork.

2. A toy comprising a clockwork, a transmission mechanism for alternately locking and releasing said clockwork, a blow-switch fulcrumed at a point causing it to be sensitive to a small force, and having a locking arm connected thereto adapted to control said transmission mechanism, whereby the successive applications of a small force to said blow-switch will alternately lock and release said clockwork.

3. A toy comprising a clockwork, a rotary member mounted on an axle of said clockwork, a blow-switch fulcrumed at a point causing it to be sensitive to a small force, a transmission mechanism provided intermediate said blow-switch and said clockwork and adapted to alternately engage and disengage said rotary member to lock and release said clockwork, respectively, upon the successive applications of a small force to said blow-switch.

4. A toy comprising a clockwork, a cam mounted on an axle of said clockwork, a blow-switch fulcrumed at a point causing it to be sensitive to a small force, a transmission mechanism provided intermediate said blow-switch and said clockwork and adapted to alternately engage and disengage said cam, to lock and release said clockwork, respectively, upon the successive applications of a small force to said blow-switch.

5. A toy comprising a clockwork, a cam mounted on an axle of said clockwork, a blow-switch fulcrumed at a point causing it to be sensitive to a small force, a transmission gearing provided intermediate said blow-switch and said clockwork and consisting of a rotary member weighted at one end thereof, brake pins on said rotary member, a locking arm associated with said blow-switch and extending into the path of motion of said brake pins, said cam adapted to impart periodic rotary motion to said rotary member upon the application of a small force to said blow-switch.

6. A toy comprising a clockwork, a blow-switch fulcrumed at a point causing it to be sensitive to a small force, a transmission gearing provided intermediate said blow-switch and said clockwork, said transmission gearing being adapted to alternately release and lock said clockwork by the action of said blow-switch, said transmission gearing being provided with brake pins and impact pins at different points of said gearing, a cam mounted on an axle of said clockwork and adapted for engagement with one or the other of said pins to effect partial rotation of said transmission gearing and therewith either locking of said clockwork when said cam is in engagement with one of said brake pins, or releasing of said clockwork upon actuation of said blow-switch.

7. A toy comprising a clockwork, a blow-switch fulcrumed at a point causing it to be sensitive to a small force, a transmission gearing provided intermediate said blow-switch and said clockwork, said transmission gearing adapted to alternately release and lock said clockwork by action of said blow-switch, a locking arm connected to said blow-switch and adapted to engage with said transmission gearing, said transmission gearing consisting of a mutilated gear wheel, a spur gear mounted on an axle of said clockwork, said mutilated gear wheel adapted to temporarily engage with said spur gear and to be disengaged therefrom until said locking arm connected to said blow-switch effects stopping of said spur gear and locking of said clockwork, and means for rotating said mutilated gear upon further actuation of said blow-switch when the toothless portion of said gear wheel is adjacent said spur gear.

8. A toy comprising a clockwork, a blow-switch fulcrumed at a point causing it to be sensitive to a small force, and a transmission gearing in the form of a friction clutch provided intermediate said blow-switch and said clockwork, said transmission gearing adapted to alternately release and lock said clockwork by action of said blow-switch.

9. A toy comprising a clockwork, a blow-switch fulcrumed at a point causing it to be sensitive to a small force, a transmission gearing provided intermediate said blow-switch and said clockwork, and a cam mounted on an axle of said clockwork and adapted to engage with said transmission gearing, said transmission gearing consisting of a swingable toothed segment controlled by said blow-switch to engage or disengage said cam, whereby successive actions of said blow-switch will cause said transmission gearing to alternately release and lock said clockwork.

10. A toy comprising a clockwork, a blow-switch fulcrumed at a point causing it to be sensitive to a small force, a transmission gearing provided intermediate said blow-switch and said clockwork, said transmission gearing adapted to alternately release and lock said clockwork by action of said blow-switch, said transmission gearing being in the form of a wheel, and balance means effective upon one operation of the blow-switch to condition said wheel for a subsequent operation of said blow-switch.

11. A toy comprising a clockwork, a cam mounted on an axle of said clockwork, a blow-switch fulcrumed at a point causing it to be sensitive to a small force, a transmission gearing provided intermediate said blow-switch and said clockwork and positioned transversely to the axle of said cam, said transmission gearing adapted to alternately release and lock said cam and in turn said clockwork by successive actions of said blow-switch.

12. A toy comprising a clockwork, a cam mounted on an axle of said clockwork, a blow-switch fulcrumed at a point causing it to be sensitive to a small force, a transmission gearing comprising a locking gear wheel provided intermediate said blow-switch and clockwork and adapted to cooperate with said cam to alternately release and lock said clockwork, and a pawl and ratchet mechanism under control of said blow-switch for adjusting said locking gear wheel so that alternately a tooth or an interstice between the teeth of said gear wheel will be positioned within the path of rotation of said cam.

13. A toy comprising a clockwork, a blow-switch fulcrumed at a point causing it to be sensitive to a small force, and a transmission gearing comprising a wheel provided intermediate said blow-switch and clockwork and adapted to alternately release and lock said clockwork by action of said blow-switch, and a cam associated with said wheel and adapted to control motion of an additional member of the toy.

14. A toy comprising a clockwork, a blow-switch fulcrumed at a point causing it to be sensitive to a small force, and a transmission gearing comprising a wheel provided intermediate said blow-switch and clockwork and adapted to alternately release and lock said clockwork by action of said blow-switch, and a cam associated with said wheel and adapted to control a reversible weighted lever by an increased pressure on said blow switch, said lever controlling some additional member of the toy.

15. A toy comprising a clockwork, a blow-switch fulcrumed at a point causing it to be sensitive to a small force, a transmission gearing provided intermediate said blow-switch and said clockwork, said transmission gearing adapted to alternately release and lock said clockwork by action of the blow-switch, and a stop member associated with said blow-switch for limiting the operative swinging motion thereof.

16. A toy comprising a clockwork, a blow-switch fulcrumed at a point causing it to be sensitive to a small force, a transmission gearing provided intermediate said blow switch and said clockwork, said transmission gearing adapted to alternately release and lock said clockwork by action of said blow-switch, the upwardly extending side plates of said clockwork forming a stop member for limiting the operative swinging motion of said blow-switch and forming a support for the latter when in its most depressed operative position.

17. A toy having the form of a toy automobile, comprising a clockwork, a blow-switch fulcrumed at a point causing it to be sensitive to a small force, a transmission gearing provided intermediate said blow-switch and clockwork, mounted underneath the motor hood of said toy automobile, said transmission gearing being in the form of a wheel adapted to alternately release and lock said clockwork by action of said blow-switch, and an aperture in said motor hood adapted to be closed or opened by means of a cover, permitting inspection of and access to the operating members of the toy.

18. A toy having the form of a toy automobile, comprising a clockwork, a blow-switch provided underneath the upper wall of the casing of said toy automobile and being exposed to the action of a current of air by means of an aperture in said upper wall of said casing, and a transmission gearing provided intermediate said blow-switch and said clockwork, said transmission gearing adapted to alternately release and lock said clockwork by action of said blow-switch.

19. A toy comprising a casing, a clockwork in said casing, a blow-switch extending along the greater part of said casing to present a relatively large blow-surface, said blow-switch being pivoted to said casing near one end thereof, a stop member limiting the operative swinging motion of said blow-switch, and a transmission gearing provided intermediate said blow-switch and said clockwork, said transmission gearing adapted to alternately release and lock said clockwork by action of said blow-switch.

20. A toy comprising a clockwork, a blow-switch fulcrumed at a point causing it to be sensitive to a small force, a transmission gearing provided intermediate said blow-switch and said clockwork, said transmission gearing adapted to alternately release and lock said clockwork by action of said blow-switch, and a double-armed lever weighted on one arm thereof for readjusting said blow-switch upon actuation into inoperative position, said double-armed lever abutting with its other arm from underneath against said blow-switch.

21. A toy comprising a clockwork, a blow-switch fulcrumed at a point causing it to be sensitive to a small force, a transmission gearing provided intermediate said blow-switch and clockwork and adapted to alternately release and lock said clockwork by action of said blow-switch, said transmission gearing being in the form of a wheel, brake pins on said wheel, and a double-armed swinging lever having one of its arms provided with a weight and adapted to engage with said brake pins, the other arm of said lever abutting under the action of said weight against said blow-switch to readjust the latter upon actuation into its inoperative position.

22. A toy comprising a clockwork, a blow-switch fulcrumed at a point causing it to be sensitive to a small force, a transmission gearing provided intermediate said blow-switch and said clockwork and adapted to alternately release and lock said clockwork by action of said blow-switch, said transmission gearing being in the form of a wheel, brake pins and impact pins on said wheel positioned at different distances from the center of the latter, a double-armed swinging lever having one of its arms provided with a weight and adapted to engage with said brake pins, the other arm of said lever abutting under the action of said weight against said blow-switch to readjust the latter upon actuation into its inoperative position, and a cam mounted on an axle of said clockwork and adapted to come into engagement with said impact pins on said wheel to alternately effect releasing and locking of the clockwork upon successive operations of the blow-switch.

HEINRICH MÜLLER.
KARL VOGL.
ALFRED WICH.